(No Model.)
J. B. KREIDER.
JOINT FOR ARTIFICIAL LIMBS.
No. 506,006.  Patented Oct. 3, 1893.
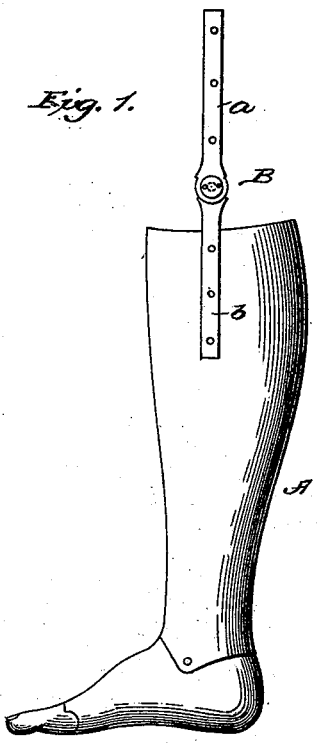
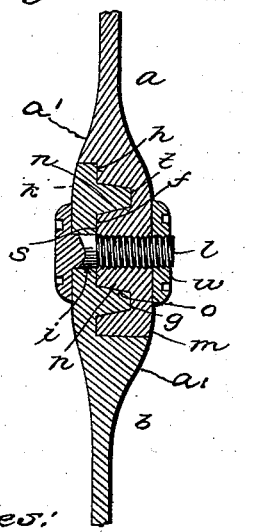
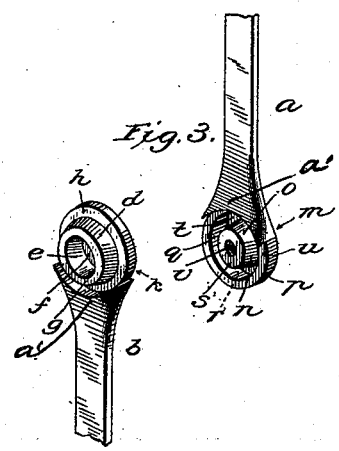
Witnesses:
Harry S. Rohrer
G. M. Copenhaver
Inventor:
Jacob B. Kreider,
By D. G. Reinohl
Atty.

UNITED STATES PATENT OFFICE.

JACOB B. KREIDER, OF ANNVILLE, PENNSYLVANIA.

JOINT FOR ARTIFICIAL LIMBS.

SPECIFICATION forming part of Letters Patent No. 506,006, dated October 3, 1893.

Application filed May 17, 1893. Serial No. 474,537. (No model.)

*To all whom it may concern:*

Be it known that I, JACOB B. KREIDER, a citizen of the United States, residing at Annville, in the county of Lebanon and State of Pennsylvania, have invented certain new and useful Improvements in Joints for Artificial Limbs; and I do hereby declare the following to be a full, clear, and exact description of the invention, such as will enable others skilled in the art to which it appertains to make and use the same.

My present invention relates to joints for artificial limbs, and has for its object certain improvements in construction which will be fully disclosed in the following specification and claim.

In the accompanying drawings, which form part of this specification—Figure 1 represents a side elevation of a limb with my improved joint applied; Fig. 2 a vertical longitudinal section, and Fig. 3 a detail perspective.

Reference being had to the drawings and the letters thereon, A, indicates an artificial limb of any approved form. B one of the knee joints which consists of two members, $a$, $b$, the former being provided with a head $b'$, on which is an annular projection $c$ having a conical outer bearing surface $d$, a conical inner bearing surface $e$, a flat bearing surface $f$, two concentric flat bearing surfaces $g$ and $h$, and a hole or passage $i$, through the head $k$, to receive a bolt $l$, to secure the two parts or sections of the joint together.

The section $b$ is provided with a head $m$ on the inner surface of which is a projection $n$ having a conical outer wall $o$, an annular projection $p$, having an inner conical wall $q$,—which two conical walls $o$ and $q$ form an annular chamber $r$, to receive the projection $c$ of section $a$,—and flat bearing surfaces $s, t$ and $u$, and a hole or passage $v$ internally screw-threaded to receive the threaded end of the bolt $l$, which after having been inserted and the two parts of the joint drawn together is locked by a lock-nut $w$. The sections $a\ b$ are also provided with a swell or shoulder $a'$ having a curved bearing-surface $c'$ at a right angle to the vertical plane of the joint, which engage the outer corresponding surface of the projection $p$ on the section $b$ and the outer surface of the head $b'$ of the section $a$ and take the end thrust wear on the upper and lower end of the joint due to the weight of the wearer of the artificial limb. The joint thus constructed is provided with two opposing conical bearing surfaces and three opposing flat bearing surfaces, and two curved vertical bearing-surfaces and is preferably made of an anti-friction metal which will require no lubricant. It may however be made of steel or other suitable metal.

Having thus fully described my invention, what I claim is—

A joint composed of two sections each having a head, one of which heads is provided with a projection having conical inner and outer walls, a flat bearing within said walls, a flat bearing surrounding the outer wall, and a flat bearing on the end of said projection, and a shoulder having a curved bearing-surface and the other section provided with a projection having an outer conical wall, a projection having an inner conical wall, flat bearing surfaces on the ends of said projections and between the projections a shoulder having a curved bearing-surface, and a bolt.

In testimony whereof I affix my signature in presence of two witnesses.

JACOB B. KREIDER.

Witnesses:
D. C. REINOHL,
ALEX. S. STEUART.